US012486406B2

United States Patent
Huang et al.

(10) Patent No.: US 12,486,406 B2
(45) Date of Patent: Dec. 2, 2025

(54) HEAT EXCHANGER AND MANUFACTURING METHOD THEREOF

(71) Applicant: Hangzhou Sanhua Research Institute Co., Ltd., Zhejiang (CN)

(72) Inventors: Hai Huang, Zhejiang (CN); Jianhua Tang, Zhejiang (CN); Shurui Yu, Zhejiang (CN); Ming Xue, Zhejiang (CN); Linjie Huang, Zhejiang (CN)

(73) Assignee: Hangzhou Sanhua Research Institute Co., Ltd., Hangzhou (CN)

( * ) Notice: Subject to any disclaimer, the term of this patent is extended or adjusted under 35 U.S.C. 154(b) by 806 days.

(21) Appl. No.: 17/730,749

(22) Filed: Apr. 27, 2022

(65) Prior Publication Data

US 2022/0259443 A1   Aug. 18, 2022

Related U.S. Application Data

(63) Continuation-in-part of application No. PCT/CN2021/142648, filed on Dec. 29, 2021.

(30) Foreign Application Priority Data

Jan. 8, 2021  (CN) .......................... 202110023744.5

(51) Int. Cl.
*C09D 5/00* (2006.01)
*C09D 7/40* (2018.01)
(Continued)

(52) U.S. Cl.
CPC ................ *C09D 5/00* (2013.01); *C09D 7/61* (2018.01); *C09D 7/66* (2018.01); *C09D 7/80* (2018.01);
(Continued)

(58) Field of Classification Search
CPC ... C09D 5/00; C09D 5/08; C09D 7/47; C09D 7/61; C09D 7/62; C09D 7/66; C09D 7/67;
(Continued)

(56) References Cited

U.S. PATENT DOCUMENTS

| | | | |
|---|---|---|---|
| 2004/0003619 A1* | 1/2004 | Lee | ......................... F28F 19/02 |
| | | | 165/DIG. 171 |
| 2004/0231828 A1 | 11/2004 | Dunne et al. | |

(Continued)

FOREIGN PATENT DOCUMENTS

| | | |
|---|---|---|
| CN | 1268923 A | 10/2000 |
| CN | 101649098 A | 2/2010 |

(Continued)

OTHER PUBLICATIONS

Machine Translation of CN 10333357 (Year: 2025).*

(Continued)

*Primary Examiner* — Eric S Ruppert
*Assistant Examiner* — Hans R Weiland
(74) *Attorney, Agent, or Firm* — Knobbe, Martens, Olson & Bear, LLP (57) ABSTRACT

The present application provides a heat exchanger and a manufacturing method of a heat exchanger. The heat exchanger includes a metal substrate, the metal substrate has a fluid channel for circulating a heat exchange medium; and the heat exchanger further includes a coating, the coating includes resin, silica and titanium dioxide, and the coating is arranged to cover at least part of a surface of the metal substrate. Silica particles and titanium dioxide particles are conducive to the formation of a complex micro-nano structure, and leveling and stability of hydrophilic resin contribute to long-term maintenance of the micro-nano structure.

(Continued)

The coating of the heat exchanger according to the present application has excellent hydrophilic durability.

19 Claims, 3 Drawing Sheets

(51) Int. Cl.
| | | |
|---|---|---|
| *C09D 7/61* | (2018.01) | |
| *C09D 7/80* | (2018.01) | |
| *C09D 201/00* | (2006.01) | |
| *F28F 19/06* | (2006.01) | |

(52) U.S. Cl.
CPC ............ *C09D 201/00* (2013.01); *F28F 19/06* (2013.01); *F28F 2245/02* (2013.01)

(58) Field of Classification Search
CPC .... C09D 7/80; C09D 201/00; C09D 133/064; C23C 18/1216; C23C 18/1254; C23C 18/1295; F28F 13/18; F28F 19/02; F28F 2245/02
See application file for complete search history.

(56) References Cited

U.S. PATENT DOCUMENTS

| | | | |
|---|---|---|---|
| 2018/0163056 A1* | 6/2018 | Okazaki | .................... C08F 2/48 |
| 2018/0340747 A1* | 11/2018 | Sasazaki | ................ F28F 19/04 |
| 2019/0127540 A1* | 5/2019 | Senzaki | ............... C09D 179/02 |
| 2019/0382873 A1* | 12/2019 | Ito | ........................... F28F 1/022 |

FOREIGN PATENT DOCUMENTS

| | | | | | |
|---|---|---|---|---|---|
| CN | 101892000 | A | | 11/2010 | |
| CN | 102356134 | A | * | 2/2012 | ........... C08K 3/0025 |
| CN | 102718411 | A | | 10/2012 | |
| CN | 103333571 | A | | 10/2013 | |
| CN | 103726302 | A | | 4/2014 | |
| CN | 103881494 | A | | 6/2014 | |
| CN | 104725640 | A | | 6/2015 | |
| CN | 104884177 | A | | 9/2015 | |
| CN | 103333571 | B | * | 12/2015 | |
| CN | 106133193 | A | * | 11/2016 | ............... C09D 5/08 |
| CN | 106669588 | A | | 5/2017 | |
| CN | 108250928 | A | | 7/2018 | |
| CN | 108485329 | A | | 9/2018 | |
| CN | 108822712 | A | | 11/2018 | |
| CN | 109929285 | A | | 6/2019 | |
| CN | 111534202 | A | | 8/2020 | |
| CN | 112175485 | A | | 1/2021 | |
| DE | 102008007190 | A1 | | 8/2009 | |
| EP | 2012081 | A1 | * | 1/2009 | ............... C09D 5/08 |
| JP | H0959537 | A | | 3/1997 | |
| KR | 20020005227 | A | | 1/2002 | |

OTHER PUBLICATIONS

Notice of the First Review Opinion of the State Intellectual Property Office for Chinese Application No. 2021100237445, dated Nov. 23, 2022, in 14 pages with English translation.
Pi, Pi-Hui et al., "Synthesis and applications of acrylic resin of cathodic electrophoretic coating for aluminum product," Electroplating & Finishing, vol. 24, No. 6, in 4 pages, with English abstract.
International Search Report for PCT Application No. PCT/CN2021/142648, dated Mar. 1, 2022, in 4 pages.

* cited by examiner

HEAT EXCHANGER AND MANUFACTURING METHOD THEREOF

CROSS REFERENCE TO RELATED APPLICATIONS

This application claims priority to Chinese Patent Application No. 202110023744.5, entitled "HEAT EXCHANGER AND MANUFACTURING METHOD THEREOF" and filed on Jan. 8, 2021, the entire contents of which are incorporated herein by reference. Any and all applications for which a foreign or domestic priority claim is identified in the Application Data Sheet as filed with the present application are incorporated by reference and made a part of this specification.

TECHNICAL FIELD

The present application relates to the field of heat exchange and material technologies, and in particular, to a heat exchanger and a manufacturing method thereof, and a thermal management system.

BACKGROUND

In the related art, in order to improve drainage performance of a surface of a heat exchanger, in some technologies, a hydrophilic coating is generally applied to a surface of a heat exchange pipe and a surface of a fin of the heat exchanger for hydrophilic treatment. However, the hydrophilic coating in the related art has poor hydrophilic durability and is still difficult to meet requirements in practical applications. There is still room for improvement in hydrophilic durability of coating materials.

SUMMARY

According to one aspect of the present application, a heat exchanger is provided. The heat exchanger includes a metal substrate with a fluid channel for circulating a heat exchange medium and a coating coated on at least part of a surface of the metal substrate. The coating includes resin, silica and titanium dioxide.

The coating of the heat exchanger according to the present application includes resin, silica and titanium dioxide, silica particles and titanium dioxide particles are conducive to the formation of a complex micro-nano structure, and the leveling and stability of the resin contribute to long-term maintenance of the micro-nano structure. A polymer chemical structure of the resin interacts with the silica particles and the titanium dioxide particles to improve density of the coating and a number of hydrophilic groups, which is conducive to the excellent hydrophilic durability of the coating.

According to another aspect of the present application, a manufacturing method of the heat exchanger as described above is provided, the method includes:
- providing a metal substrate and a composite material, wherein the metal substrate has at least one fluid channel for circulating a heat exchange medium, and the composite material includes resin, silica and titanium dioxide; and
- applying the composite material to at least part of a surface of the metal substrate, and curing, to obtain the heat exchanger.

In the manufacturing method of a heat exchanger according to the present application, a composite material is applied to at least part of a surface of a metal substrate and cured to obtain a heat exchanger with a coating, silica particles and titanium dioxide particles in the composite material are conducive to the formation of a complex micro-nano structure, and the leveling and stability of the resin contribute to long-term maintenance of the micro-nano structure. A polymer chemical structure of the resin interacts with the silica particles and the titanium dioxide particles to improve density of the coating and a number of hydrophilic groups, which is conducive to the excellent hydrophilic durability of the coating.

Additional aspects and advantages of the present application will be set forth in part in the following description, and will become apparent in part from the following description or may be learned from practice of the present application.

DESCRIPTION OF EMBODIMENTS

In order to make the objectives, technical solutions and advantages of the present application clearer, the technical solutions of the present application will be described clearly and completely below with reference to embodiments of the present application. Obviously, the described embodiments are merely some of rather than all of the embodiments of the present application. All other embodiments acquired by those skilled in the art without creative efforts based on the technical solutions according to the present application and the provided embodiments shall fall within the protection scope of the present application. For specific conditions not specified in the embodiments, routine conditions or conditions recommended by manufacturers are generally used. Reagents or instruments without specified manufacturers are all commercially available products.

The ends points and any value in the ranges disclosed herein are not limited to the exact ranges or values; instead, those ranges or values shall be comprehended as encompassing values that are close to those ranges or values. For numeric ranges, end points of the ranges, end points of the ranges and discrete point values, and the discrete point values may be combined to obtain one or more new numeric ranges.

It is to be noted that the term "and/or" used herein is merely an association relationship describing associated objects, indicating that three relationships may exist. For example, A and/or B indicates that there are three cases of A alone, A and B together, and B alone. As used in the embodiments of the present application and the appended claims, the singular forms of "a/an", "said", and "the" are also intended to comprise plural forms, unless otherwise clearly specified by the context.

In the description of the present application, a list of items connected by the term "at least one of" or other similar terms may mean any combinations of the listed items. For example, if items A and B are listed, the phrase "at least one of A and B" means only A; only B; or A and B. In another example, if items A, B and C are listed, the phrase "at least one of A, B and C" means only A; or only B; only C; A and B (excluding C); A and C (excluding B); B and C (excluding A); or all of A, B and C. The item A may comprise a single element or multiple elements. The item B may comprise a single element or multiple elements. The item C may comprise a single element or multiple elements. In addition, the term "at least part of a surface" or other similar terms mean any part of the surface or the whole surface of the member. For example, at least part of a surface of a heat exchanger means a part or parts of the surface of the heat exchanger, or the whole surface of the heat exchanger.

In a specific embodiment, the present application is described in further detail below through specific embodiments.

In the related art, a micro-channel heat exchanger is an efficient heat exchange device developed in the 1990s, which may be widely used in chemical, energy and environment fields. The micro-channel heat exchanger has many different features than conventional scale equipment, such as a small volume, a light weight, high efficiency, and high strength. A micro-channel technology triggers technological innovations in efficiency improvement and emission reduction in fields such as new energy vehicle thermal management systems, home air conditioners, commercial air conditioners and refrigeration equipment at the same time.

In the related art, in order to improve a drainage effect on a surface of a heat exchanger, one improvement means is to perform hydrophilic treatment on the surface of the heat exchanger. Currently, the hydrophilic treatment on the surface of the heat exchanger is mainly implemented by applying hydrophilic painting to form a coating (hydrophilic film). For example, the hydrophilic painting is applied to a surface of an aluminum fin to form a hydrophilic film, so that water droplets spread quickly on the surface of the coating and flow away. Although some hydrophilic painting in the related art has good film forming and leveling, the coating formed has poor heat resistance or weather resistance, poor hydrophilicity and high costs, which leads to difficulties in meeting requirements of practical applications. Therefore, how to enable an existing thermal management system (such as a low-temperature heat pump air conditioning heat exchange system) to have better drainage, the development of new durable hydrophilic materials has become a problem to be urgently solved in related industries.

Based on this, in the technical solutions of the embodiments of the present application, a heat exchanger and a manufacturing method of a heat exchanger are provided. The heat exchanger according to technical methods of the embodiments of the present application has a coating with excellent hydrophilic durability. The coating has good durability while ensuring hydrophilicity, so that it can prolong a service life of the heat exchanger and. See below for descriptions of specific technical solutions.

Herein, percentages, proportions or parts referred to are calculated by mass unless otherwise stated. "part by mass" refers to a basic unit of measurement of a mass proportion of multiple components. 1 part may represent any unit mass. For example, 1 part may be expressed as 1 g, 1.68 g, 5 g, or the like.

An embodiment of the present application provides a heat exchanger. The heat exchanger includes a metal substrate. The metal substrate has a fluid channel for circulating a heat exchange medium. Specifically, at least part of a surface of the metal substrate of the heat exchanger is provided with a coating. The coating includes resin, silica and titanium dioxide.

In some embodiments, the heat exchanger includes a collecting pipe 10, a fin 13 and a plurality of heat exchange pipes 12. The collecting pipe 10 includes a first collecting pipe 101 with a first chamber/inner cavity and a second collecting pipe 102 with a second chamber/inner cavity. The first collecting pipe 101 and the second collecting pipe 102 is separated from each other and parallel with each other. The heat exchange pipe 12 could be a micro-channel flat tubes with a row of micro channels 121. The micro channels 121 is fluidic communication with the first chamber and the second chamber for flowing refrigerant therebetween. The fin 13 could be corrugated fin sandwiched between two adjacent flat tubes. The fin 13 includes a plurality of crests 131 connecting to one of the two adjacent flat tubes and a plurality of troughs 132 connecting to the other one of the two adjacent flat tubes. A coating layer 11 coated on at least one the surface of the corrugated fin 13, the flat tube 12, and the collecting pipe 10. The coating layer 11 comprises resin, silica and titanium dioxide. The heat exchange pipes 12 are fixed to the collecting pipe 10, and inner cavities of the heat exchange pipes 12 are communicated with an inner cavity of the collecting pipe 10. The fin 3 is located between two adjacent heat exchange pipes 12. The coating is arranged to cover at least part of a surface of at least one of the collecting pipe 10, the heat exchange pipe 12 and the fin 3.

Figure 1:
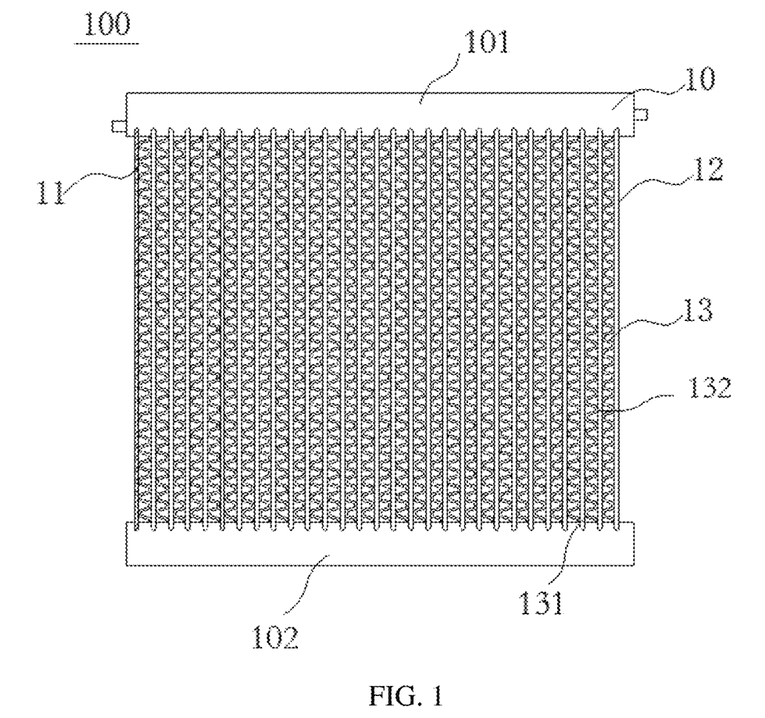
FIG. 1 is a schematic structural diagram of a heat exchanger according to an exemplary embodiment of the present application.

Exemplarily, as shown in FIG. 1, a main structure of a metal substrate of the heat exchanger 100 includes a collecting pipe 10, heat exchange pipes 12 and fins 13. The heat exchange pipes 12 are fixed to the collecting pipe 10, and inner cavities of the heat exchange pipes 12 are communicated with an inner cavity of the collecting pipe 10. The fin 13 is located between two adjacent heat exchange pipes 12. The heat exchanger 100 is a micro-channel heat exchanger. At least part of a surface of the heat exchanger tube 12 and/or the fin 13 has a coating 11. In FIG. 1, the coating 11 is indicated by referring to the leftmost shadowed part on the surface of the heat exchange pipe 12. Certainly, in other embodiments, the coating 11 may be applied to surfaces of other heat exchange pipes 12, fins 13 and collecting pipes 10.

In FIG. 1, two collecting pipes 10 are provided, a plurality of heat exchange pipes 12 are provided, and at least one fin 13 (generally more fins) is provided. The heat exchange pipes 12 are connected between the two collecting pipes 10. A width of the heat exchange pipe 12 is greater than a thickness of the heat exchange pipe 12, and the heat exchange pipe 12 has a plurality of heat exchange channels extending along a length direction of the heat exchange pipe 12. Therefore, the heat exchange pipe 12 may be a micro-channel flat tube or elliptical tube.

The plurality of heat exchange pipes 12 are arranged along an axial direction of the collecting pipe 10. The fin 13 is wavy along the length direction of the heat exchange pipe 12. A crest portion and a trough portion of the fin 13 are respectively connected to two adjacent heat exchange pipes. In some implementations, a partial region of the fin 13 may be provided with a window structure to further strengthen the heat exchange.

In some embodiments, an outer surface of the metal substrate has an uneven rough surface, and roughness (Ra)

of the rough surface meets 0.5 µm≤Ra≤10 µm. Exemplarily, the roughness of the rough surface is 0.5 µm, 1 µm, 2 µm, 3 µm, 4 µm, 5 µm, 6 µm, 7 µm, 8 µm, 9 µm, 10 µm or any value in a range formed by any two of these point values. It may be understood that the roughness of the outer surface of the metal substrate is controlled within the above range, which is conducive to adhesion of the coating.

In some embodiments, the micro-channel heat exchanger is an all-aluminum micro-channel heat exchanger. The structure of the micro-channel heat exchanger and the connection relationships between the components are the conventional knowledge in the art, which are not described in detail herein.

In some implementations, the coating 11 is a single-layer coating, and a weight per unit area of the coating 11 ranges from 9 $g/m^2$ to 14 $g/m^2$.

Figure 2:
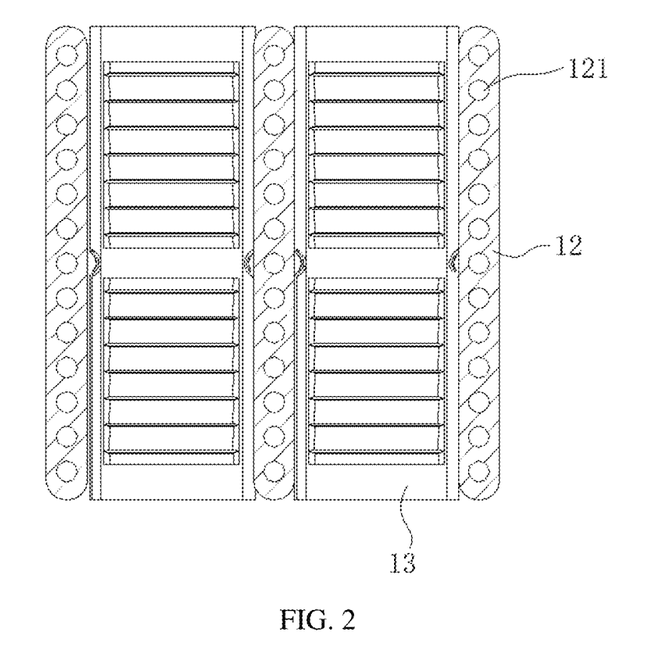
FIG. 2 is a schematic sectional view of fins and heat exchange pipes according to an exemplary embodiment of the present application.
Figure 3:
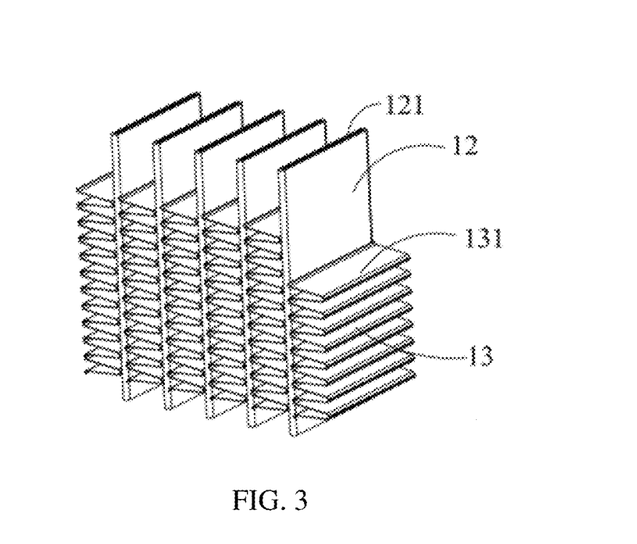
FIG. 3 is a schematic perspective view of fins and heat exchange pipes according to an exemplary embodiment of the present application.
Figure 4:
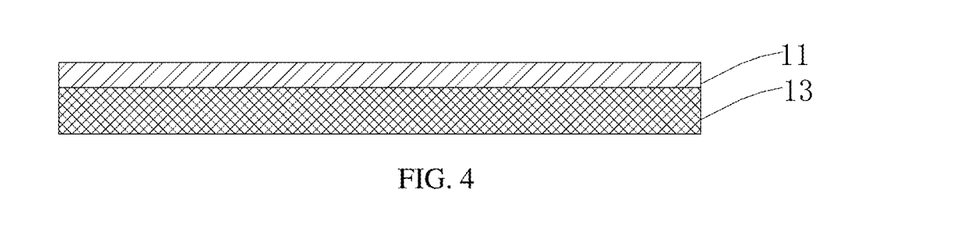
FIG. 4 is a schematic sectional view of a fin portion of a heat exchanger according to an exemplary embodiment of the present application.

As shown in FIG. 2, in some embodiments, at least part of a surface of the fin 13 has a coating 11.

The coating of the heat exchanger according to the present application includes resin, hydrophilic modified silica and titanium dioxide, at least part of the resin is hydrophilic resin, silica particles and titanium dioxide particles are conducive to the formation of a complex micro-nano structure, and leveling and stability of the hydrophilic resin contribute to long-term maintenance of the micro-nano structure. A polymer chemical structure of the hydrophilic resin interacts with the silica particles and the titanium dioxide particles to improve density of the coating and a number of hydrophilic groups, which is conducive to the excellent hydrophilic durability of the coating.

In some embodiments, the coating according to the embodiments of the present application is formed by applying a composite material to the surface of the heat exchanger. The composite material includes at least hydrophilic modified silica sol and titanium dioxide sol, and includes a small amount of hydrophilic resin. A content of the hydrophilic modified silica sol is greater than that of the titanium dioxide.

The combination of hydrophilic resin and hydrophilic mixed sol containing hydrophilic modified silica sol and titanium dioxide sol can give full play to the advantages of each component, which are applied to the surface of the heat exchanger to form a coating with strong hydrophilic durability.

The composite material according to the embodiments of the present application is applied to the field of heat exchangers. The composite material may be applied to at least part of the surface of the heat exchanger by dip coating, spray coating or the like, and a coating with excellent durability and hydrophilicity may be obtained on the corresponding surface of the heat exchanger. Correspondingly, the hydrophilic durability of the heat exchanger surface can be improved, and the hydrophilic life of the heat exchanger can be prolonged.

An embodiment of the present application further provides a method for manufacturing the heat exchanger as described above, comprising the following steps:
providing a metal substrate and a composite material, wherein the metal substrate has at least one fluid channel for circulating a heat exchange medium, and the composite material includes resin, silica and titanium dioxide; and
applying the composite material to at least part of a surface of the metal substrate, and curing it to obtain the heat exchanger.

It should be understood that the metal substrate includes at least one of the collecting pipe, the heat exchange pipe and the fin.

It is to be noted that the composite material is not equivalent to the coating. After the composite material is applied to at least part of a surface of at least one of the collecting pipe, the heat exchange pipe and the fin, the whole structure above-described is required to be cured at a high temperature. During the high-temperature curing, in the composite material, for example, an aqueous solvent of hydrophilic mixed sol may volatilize with the temperature, while groups carried by hydrophilic modified silica particles and titanium dioxide particles may dehydrate and condense with some groups on a surface of aluminum of the heat exchanger to form a stable chemical chain structure, and the hydrophilic modified silica particles and the titanium dioxide particles may disperse into a polymer network structure formed by the hydrophilic resin. After completion of the curing, a heat exchanger product with a coating may be finally obtained.

In some embodiments of the present application, prior to the step of providing a composite material, a step of preparing the composite material is further included. The step of preparing the composite material includes:
mixing 10 to 30 parts by mass of hydrophilic resin with 70 to 90 parts by mass of hydrophilic mixed sol evenly by ultrasonic mixing and/or mechanical stirring.

Specifically, a preparation method of the composite material involves mixing hydrophilic mixed sol containing hydrophilic modified silica sol and titanium dioxide sol with hydrophilic resin to form the composite material. Hydrophilic mixed sol and hydrophilic resin have a large number of hydrophilic groups (carboxyl, hydroxyl, etc.). The hydrophilic groups can improve hydrophilic properties of a surface of a coated article, and the liquid is easy to spread and slip away on the surface of the coated article, so that the surface of the coated article is not prone to water accumulation. Silica particles and titanium dioxide particles in the hydrophilic mixed sol can form a complex micro-nano structure on the surface of the coated article. The micro-nano structure is the key to the hydrophilicity and durability of the coating, and the leveling performance and stability of the hydrophilic resin are conducive to the long-term maintenance of the micro-nano structure on the surface of the coated article, which is conducive to the improvement of the hydrophilic durability of the coating formed by the composite material. Moreover, the addition of the hydrophilic resin improves the density of the coating, enhances the corrosion resistance of the coating, is beneficial to maintain the integrity of the hydrophilic coating, and is conducive to the improvement of the durability.

In some specific embodiments, the preparation method of the composite material includes: mixing 10 to 30 parts of hydrophilic resin with 70 to 90 parts of hydrophilic mixed sol evenly, for example, first mixing them for 10 to 30 min by means of ultrasound and then mixing them for 10 to 30 min by means of mechanical stirring. The ultrasonic mixing helps break up large particle clusters into small particle clusters, and the mechanical mixing by stirring helps evenly mix the particle clusters. This helps to mix hydrophilic resin and hydrophilic mixed sol fully and evenly, and gives full play to their advantages, and thus a composite material with excellent hydrophilic durability is obtained.

Exemplarily, the time for the ultrasonic mixing is 10 min, 12 min, 15 min, 18 min, 20 min, 25 min, 30 min, or the like; and the time for the mechanical stirring is 10 min, 12 min, 15 min, 18 min, 20 min, 25 min, 30 min, or the like. In some embodiments, the time for the ultrasonic mixing and the time for the mechanical stirring are 15 min, respectively. Certainly, in other embodiments, the mixing may be performed for 10 to 30 min by means of mechanical stirring first, and then performed for 10 to 30 min by means of ultrasound. Alternatively, only one of mechanical stirring and ultrasonic mixing may be adopted, and the mixing time may be about 30 min.

When a heat exchanger, such as an all-aluminum microchannel heat exchanger, with a coating 11, is obtained by the manufacturing method according to the embodiments of the present application, an initial static contact angle on a surface of the heat exchanger is no greater than 10°, an excellent hydrophilic effect is brought, and the preparation process of the composite material corresponding to the coating is green and environmentally friendly, with basically no harmful ingredient emissions, is easy to operate, and has low costs. The hydrophilic mixed sol in the composite material has good wettability with an aluminum base material, and a Si—O—Al bond can be formed between Si and Al, which improves the adhesion of the formed coating. With the addition of the hydrophilic resin to the composite material, the leveling property of the mixed sol is further improved, a surface state of the coating is improved, and the density of the coating is improved at the same time, and the basic corrosion resistance can also be improved to some extent, and in particular, the hydrophilic durability of the coating is significantly improved.

According to the embodiments of the present application, raw materials for preparing the composite material include hydrophilic resin. The hydrophilic resin is 10 to 30 parts by mass, which may be, typically but non-restrictively, for example, 10 parts, 12 parts, 15 parts, 16 parts, 17 parts, 18 parts, 20 parts, 22 parts, 25 parts, 28 parts, 30 parts or any value in a range formed by any two of these point values.

According to the embodiments of the present application, raw materials for preparing the composite material include hydrophilic mixed sol. The hydrophilic mixed sol is 70 to 90 parts by mass, which may be, typically but non-restrictively, for example, 70 parts, 72 parts, 75 parts, 78 parts, 80 parts, 82 parts, 85 parts, 88 parts, 90 parts or any value in a range formed by any two of these point values.

During the preparation of the composite material, the contribution of each raw material to property indicators, such as hydrophilicity, leveling property and the synergy of the whole system of the composite material, was considered comprehensively. By making all the raw materials in the above range, through the synergy between the hydrophilic resin and the hydrophilic mixed sol with specific contents, a variety of properties are balanced to enable the prepared composite material to have good hydrophilic durability and stable properties.

According to the embodiments of the present application, sources of the hydrophilic resin and the hydrophilic mixed sol are not specially limited, which may be prepared or commercially available. For example, during the preparation of the composite material, the hydrophilic resin may be prepared first, followed by the hydrophilic mixed sol; or the hydrophilic mixed sol may be prepared first, followed by the hydrophilic resin; or the hydrophilic resin and the hydrophilic mixed sol may be prepared at the same time. A sequence of preparation of the hydrophilic resin and the hydrophilic mixed sol is not limited in the embodiment of the present application. Alternatively, in some other implementations, at least one of the hydrophilic resin and the hydrophilic mixed sol may be obtained through commercial purchase.

The preparation of the hydrophilic mixed sol is described in detail below.

In some embodiments, the hydrophilic mixed sol includes hydrophilic modified silica sol and titanium dioxide sol; as counted in parts by mass, the hydrophilic modified silica sol is 90 to 92 parts, and the titanium dioxide sol is 4 to 6 parts. The hydrophilic mixed sol contains silica and titanium dioxide, enabling the coating to form a structure with relatively stable physical and chemical properties, so that the coating is stable and dense, and the hydrophilicity of the coating can be further improved to achieve good hydrophilicity and durability.

In that case, the hydrophilic modified silica sol is 90 to 92 parts by mass, which may be, typically but non-restrictively, for example, 90 parts, 90.5 parts, 90.8 parts, 91 parts, 91.2 parts, 91.5 parts, 92 parts or any value in a range formed by any two of these point values. In the preparation of the silica particles by a sol-gel process, there are a large number of Si—OH groups on the surface of the silica particles, which has reactive group hydroxyl (—OH). Through the interaction between the particles, a coating with excellent hydrophilicity can be obtained. In addition, the hydrophilicity of the coating is improved by keeping the content of silica in this range.

In that case, the titanium dioxide sol is 4 to 6 parts by mass, which may be, typically but non-restrictively, for example, 4 parts, 4.5 parts, 4.8 parts, 5 parts, 5.2 parts, 5.5 parts, 5.8 parts, 6 parts or any value in a range formed by any two of these point values. The titanium dioxide particles have the characteristics of amphoteric particles and photocatalysis, and have photoinduced superhydrophilic properties. In the preparation of the titanium dioxide particles by a sol-gel process, there are a large number of Ti—OH groups on the surface of the titanium dioxide particles, which has reactive group hydroxyl (—OH), and a coating with excellent hydrophilicity can be obtained.

The durability of the coating formed by the hydrophilic modified silica sol is slightly worse than the coating formed by the titanium dioxide sol, but the coating formed by the hydrophilic modified silica sol has a better film-forming effect. By contrast, the titanium dioxide sol has a poor film-forming effect, but strong coating durability. By adjusting content proportions of the hydrophilic modified silica sol and the titanium dioxide sol, the advantages of silica and titanium dioxide can be brought into full play, the synergistic effect of the two can be enhanced, which helps to further improve the hydrophilicity of the coating, and bring a good film-forming effect.

In some embodiments, the hydrophilic mixed sol includes the following parts by mass of raw materials: 90 to 92 parts of hydrophilic modified silica sol, 4 to 6 parts of titanium dioxide sol and 3 to 5 parts of a pH modifier.

In some embodiments, a preparation method of the hydrophilic mixed sol includes:

as counted in parts by mass, mixing 90 to 92 parts of hydrophilic modified silica sol with 4 to 6 parts of titanium dioxide sol to obtain a mixture, adjusting a pH value of the mixture to 2.5 to 3.5 by 3 to 5 parts of a pH modifier, and then stirring the mixture to react at 45° C. to 55° C. for 3.5 hours to 5 hours, to obtain the hydrophilic mixed sol.

According to the embodiments of the present invention, sources and specific types of the raw materials for preparing the hydrophilic mixed sol are not limited, which may be flexibly selected by those skilled in the art according to actual requirements, provided that the objective of the present invention is not limited. For example, raw materials familiar to those skilled in the art may be used, commercially available products may be used, or raw materials prepared may be used. In some implementations of the present application, in the above-described 90 to 92 parts of hydrophilic modified silica sol, one part is obtained from commercially available products, and the other part is obtained with the preparation method according to the embodiments of the present application, which helps improve the hydrophilicity and hydrophilic durability. Certainly, in some other implementations of the present application, the above-described 90 to 92 parts of hydrophilic modified silica sol may be all obtained from commercially available products. Alternatively, in some other embodiments of the present application, the above-described 90 to 92 parts of hydrophilic modified silica sol may be all obtained with the preparation method according to the embodiments of the present application.

In some embodiments, in the above-described 90 to 92 parts of hydrophilic modified silica sol, 34 to 36 parts of the hydrophilic modified silica sol are prepared with the preparation method according to the embodiments of the present application, and the rest of the hydrophilic modified silica sol may be commercially available.

The embodiments of the present invention has no restrictions on the sources and specific types of the titanium dioxide sol, the pH modifier and other raw materials, which may be flexibly selected by those skilled in the art according to actual requirements, provided that the objective of the present invention is not limited. For example, raw materials familiar to those skilled in the art may be used, commercially available products may be used, or raw materials prepared with preparation methods familiar to those skilled in the art may be used.

The hydrophilic mixed sol is mainly prepared from hydrophilic modified silica sol, titanium dioxide sol and a pH modifier that are suitable and in appropriate amounts, to obtain hydrophilic mixed sol with excellent hydrophilic properties. The hydrophilic modified silica sol and the titanium dioxide sol are hydrophilic materials, and have certain reactive groups or hydrophilic groups, such as hydroxyl (—OH). Through the interaction between the particles, a dense coating can be obtained, which can play its own chemical stability, weather resistance, hydrophilicity and other basic properties.

In order to further optimize the amount of each component in the hydrophilic mixed sol and enhance the synergistic effect of the components, in some embodiments, the hydrophilic mixed sol includes the following parts by mass of raw materials: 91 parts of hydrophilic modified silica sol, 5 parts of titanium dioxide sol and 4 parts of a pH modifier. Further, in some embodiments, the hydrophilic mixed sol includes the following parts by mass of raw materials: 35 parts of self-made hydrophilic modified silica sol, 56 parts of commercially available hydrophilic modified silica sol, 5 parts of titanium dioxide sol and 4 parts of a pH modifier.

In some embodiments, a preparation method of the self-made hydrophilic modified silica sol includes the following steps:
as counted in parts by mass, mixing 36 to 40 parts of a silane precursor with 50 to 56 parts of a solvent evenly at 45° C. to 55° C., adding 2 to 4 parts of water and 0.5 to 1.5 parts of a surfactant, mixing them evenly, and then adding 1 to 2 parts of acid and 2 to 4 parts of water to react for 22 hours to 24 hours, to obtain the hydrophilic modified silica sol. Exemplarily, the silane precursor may be, for example, 36 parts, 37 parts, 38 parts, 39 parts, or 40 parts by mass. The solvent may be, for example, 50 parts, 51 parts, 52 parts, 53 parts, 54 parts, 55 parts, or 56 parts by mass. The water may be, for example, 1 part, 1.5 parts, 2 parts, 2.5 parts, 3 parts, 3.5 parts, or 4 parts by mass. The surfactant may be, for example, 0.5 parts, 0.8 parts, 1 part, 1.2 parts, or 1.5 parts by mass. The acid may be, for example, 1 part, 1.2 parts, 1.5 parts, 1.6 parts, 1.8 parts, or 2 parts by mass. A mixing temperature is, for example, 45° C., 46° C., 48° C., 50° C., 52° C., 54° C., 55° C., or the like; and reaction time is, for example, 22 h, 22.5 h, 23 h, 23.5 h, 24 h, or the like.

In the case of meeting the hydrophilic properties of the hydrophilic mixed sol, the specific type of the silane precursor may be varied. Specifically, in some embodiments, the silane precursor includes 30 to 32 parts of γ-glycidyl ether oxypropyl trimethoxysilane (KH-560) and 6 to 8 parts of ethyl orthosilicate. Exemplarily, the KH-560 may be, for example, 30 parts, 31 parts or 32 parts by mass; and the ethyl orthosilicate may be, for example, 6 parts, 7 parts, or 8 parts by mass.

In addition, in other embodiments, the silane precursor is not limited to those listed above. In the case of meeting the hydrophilic properties of the hydrophilic mixed sol, the silane precursor may also be of other types, such as hexamethyldisilamine and chlorosilane, which are not described in detail one by one herein.

A mixture of KH-560 and ethyl orthosilicate with certain content is used as the silane precursor, which is more helpful to obtain hydrophilic modified silica sol with excellent hydrophilicity, and thereby helping to obtain sol with good hydrophilicity and durability.

In the case of meeting the hydrophilic properties of the hydrophilic mixed sol, the specific types of the solvent, the surfactant and the acid may be varied. Specifically, in some embodiments, the solvent includes an alcohol solvent. Further, the alcohol solvent includes an alcohol solvent with a number of carbon atoms ranging from 1 to 10, preferably an alcohol solvent with a number of carbon atoms ranging from 1 to 8, and more preferably an alcohol solvent with a number of carbon atoms ranging from 1 to 4. Further, in some embodiments, the solvent is any one of methanol, ethanol and isopropyl alcohol or a mixture of any two or more thereof in any proportion. Therefore, sources are widely available and costs are low.

In some embodiments, the surfactant includes, but is not limited to, at least one of sodium dodecyl sulfate, sodium dodecyl sulfonate, sodium dodecyl benzene sulfonate and cetyl benzene sulfonate. Further, in some embodiments, the surfactant is sodium dodecyl sulfate. Therefore, costs are low, sources are extensive, and a use effect is good.

In some embodiments, the acid includes, but is not limited to at least one of formic acid and acetic acid. Further, in some embodiments, the acid is formic acid.

In some specific embodiments, a preparation method of the above-described self-made hydrophilic modified silica sol includes the following steps: as counted in parts by mass, mixing 31 parts of KH-560, 7 parts of ethyl orthosilicate and 54 parts of anhydrous ethanol evenly by mechanical stirring under a water bath condition at 45° C. to 55° C., to obtain a mixture; mixing 3 parts of water and 1 part of sodium dodecyl sulfate evenly, and then adding to the mixture; then dropping 1 part of formic acid and 3 parts of water to the mixture, mixing them evenly, and reacting for about 24 h as keeping the above-described reaction conditions unchanged, to obtain the hydrophilic modified silica sol.

Equations or reaction mechanisms involved in the preparation of the hydrophilic modified silica sol may be shown as follows:
1) hydrolytic condensation of ethyl orthosilicate:
   $Si(OCH_2CH_3)_4 + 2H_2O \rightarrow SiO_2 + 4C_2H_5OH$,
2) hydrolysis of KH560: $R—Si(OCH_3)_3 + 3H_2O \rightarrow R—Si(OH)_3 + CH_3OH$;
   polycondensation of KH560: $R—Si(OH)_3 + R—Si(OH)_3 \rightarrow R—Si(OH)_2—O—Si(OH)_2—R + H_2O$,
   $R—Si(OH)_3 + R\text{-}Si(OCH3)_3 \rightarrow R—Si(OH)_2—O—Si(OH)_2—R + CH_3OH$,
   wherein, R represents a long chain group $—(CH_2)_3O—CH_2—CH—OCH_2$, and KH560 has the following the structural formula (I):

(I)

3) condensation of KH560 with silicon hydroxyl: $R—Si(OH)_3 + Si(OH)_4 \rightarrow R—Si(OH)_2—O—Si(OH)_3 + H_2O$.

The hydrophilic modified silica sol prepared according to the embodiments of the present application example contains a large number of hydroxyl (—OH) hydrophilic groups, so that the sol shows hydrophilicity, and at the same time, dehydration condensation between hydroxyl groups forms a spatial network structure. Thus, dispersed silica, titanium dioxide and other nano-particles further added to the hydrophilic mixed sol are filled into the space network structure, to form a stable sol system, i.e., hydrophilic mixed sol. The sol of the hydrophilic mixed sol can be bonded with —OH in a metal base to form covalent bonds by dehydration condensation, which protects the metal base after film-forming, so as to achieve effect of hydrophilicity and corrosion resistance.

In the case of meeting the hydrophilic properties of the hydrophilic mixed sol, the pH modifier includes organic acid or inorganic acid. Specifically, in some embodiments, the pH modifier is formic acid.

In some specific implementations, the preparation method of the hydrophilic mixed sol includes:
   preparing the self-made hydrophilic modified silica sol according to the above preparation method; as counted in parts by mass, mixing 35 parts of the self-made hydrophilic modified silica sol and 56 parts of commercially available silica sol with 5 parts of titanium dioxide sol, adjusting a pH value of the system to about 3.0 by using 4 parts of the pH modifier, i.e., formic acid, and then stirring the mixture under a water bath condition at 45° C. to 55° C. to react for about 4 hours to 5 hours, to obtain the hydrophilic mixed sol. The hydrophilic mixed sol obtained is mixed sol with an enhanced hydrophilic effect.

In the hydrophilic mixed sol prepared with the above method, the self-made hydrophilic modified silica sol, the commercially available silica sol and the titanium dioxide sol are mixed, which can give full play to the advantages of each component, can obtain mixed sol with good hydrophilicity and durability, and further improve the hydrophilicity of the coating. Surfaces of silica particles have a large amount of Si—OH, with excellent hydrophilicity. The titanium dioxide particles therein have photo-induced superhydrophilic properties: under light, electrons in a $TiO_2$ valence band are excited to a conduction band, and the electrons and holes migrate to a surface of $TiO_2$ to generate electron hole pairs on the surface; the electrons react with $Ti^{4+}$, and the holes react with surface oxygen ions, to form positive trivalent titanium ions and oxygen vacancies respectively. In this case, the water in the air is dissociated and adsorbed in the oxygen vacancies and becomes chemisorbed water (surface hydroxyl groups). The chemisorbed water may further adsorb the water in the air and form a physical adsorption layer. That is, a highly hydrophilic micro-zone is formed around a trivalent titanium defect.

In addition, silica particles contained in the self-made hydrophilic modified silica are in nanometer scale, which has good dispersibility, while that contained in the commercially available silica sol may be in micron scale and sub-micron scale. By combining silica particles with different particle sizes, surface morphology, surface energy and hydrophilicity of the coating are improved.

The preparation of the hydrophilic resin is described in detail below.

In the composite material according to the present application, the hydrophilic mixed sol is compounded with the hydrophilic resin, which may draw characteristics of low costs and easy film formation from the hydrophilic resin, give full play to their advantages, and broaden the scope of use. The addition of the hydrophilic resin may further improve the leveling property of the mixed sol and improve the surface state of the coating. At the same time, the density of the coating is improved, and the corrosion resistance of the matrix can be improved. In particular, the hydrophilic durability of the coating can be significantly improved. In the case of meeting the above requirement, the specific type of the hydrophilic resin may be varied. Specifically, in some embodiments, the hydrophilic resin includes at least one of acrylic resin, amino resin, polyurethane resin, alkyd resin and epoxy resin. For example, the hydrophilic resin may be acrylic resin, amino resin, polyurethane resin, alkyd resin (containing oil-free alkyd), epoxy resin, or a mixture of any two or more of the above hydrophilic resin in any proportion. In addition, in other embodiments, the hydrophilic resin is not limited to those listed above. In the case of meeting the above requirement, the hydrophilic resin may also be of other types.

The embodiments of the present invention has no restrictions on the sources of the hydrophilic resin, which may be flexibly selected by those skilled in the art according to actual requirements, provided that the objective of the present invention is not limited. For example, raw materials familiar to those skilled in the art may be used, commercially available products may be used, or raw materials prepared may be used.

In some embodiments, the hydrophilic resin is acrylic resin. In particular, in some embodiments, the acrylic resin is prepared with the following method according to the embodiments of the present application. Certainly, in other embodiments, the acrylic resin may also be commercially available.

In some embodiments, at least part of the acrylic resin is prepared with the following method: mixing a first portion of an initiator with propylene glycol methyl ether acetate preheated to a first temperature, to obtain a mixture A; mixing a first monomer, a second monomer and a second portion of the initiator, to obtain a mixture B; dropping the mixture B to the mixture A, and after dropping, adding a third portion of the initiator to a reaction system to react for 0.5 hours to 2 hours at a temperature of 90° C. to 110° C., to obtain the acrylic resin.

In some embodiments, as counted in parts by mass, parts by mass of raw materials for preparing the acrylic resin are: 45 to 55 parts of propylene glycol methyl ether acetate, 0.5 to 1 part of the first portion of the initiator, 30 to 35 parts of the first monomer, 15 to 20 parts of the second monomer, 0.2 to 0.4 parts of the second portion of the initiator, and 0.1 to 0.3 parts of the third portion of the initiator. Further, in some embodiments, as counted in parts by mass, parts by mass of raw materials for preparing the acrylic resin are: 48 to 52 parts of propylene glycol methyl ether acetate, 0.5 to 1 part of the first portion of the initiator, 32 to 34 parts of the first monomer, 16 to 18 parts of the second monomer, 0.3 parts of the second portion of the initiator, and 0.2 parts of the third portion of the initiator.

During the above-described preparation of the acrylic resin, the first portion of the initiator, the second portion of the initiator and the third portion of the initiator may be a same type of initiators or different types of initiators, which are the same type of initiators in some embodiments, with the first portion of the initiator, the second portion of the initiator and the third portion of the initiator being different mainly in their addition contents.

The embodiments of the present invention has no restrictions on the sources and specific types of the initiator, the first monomer and the second monomer, which may be flexibly selected by those skilled in the art according to actual requirements, provided that the objective of the present invention is not limited. For example, raw materials familiar to those skilled in the art may be used, commercially available products may be used, or raw materials prepared may be used.

In consideration of properties, costs, and system synergies of the acrylic resins prepared, in some embodiments, the initiator includes, but is not limited to, at least one of tert-butyl hydroperoxide, azodiisobutyronitrile, dibenzoyl peroxide, tert-amyl peroxide, di-tert-butyl peroxide, di-tert-amyl peroxide, dicumyl peroxide, ethyl 3,3-bis(tert-butylperoxy)butyrate, ethyl 3,3-bis(tert-amylperoxy)butyrate, tert-butyl peroxybenzoate, tert-amyl peroxybenzoate, tert-amyl peroxy pivalate, 1,1'-bis(tert-butylperoxy)-3,3,5-trimethylcyclohexane, tert-butyl peroxy-2-ethylhexanoate and tert-amyl peroxy-2-ethylhexanoate. Further, in some embodiments, the initiator is tert-butyl hydroperoxide.

In consideration of properties, costs, and system synergies of the acrylic resins prepared, in some embodiments, each of the first monomer and the second monomer is independently selected from at least one of acrylic acid, hydroxyethyl methacrylate, methacrylic acid, styrene, methyl methacrylate, methyl acrylate, butyl acrylate, hydroxypropyl acrylate, methyl acrylamide, acrylamide and N-methyl acrylamide.

For example, in some implementations, the first monomer is acrylic acid, and the second monomer is hydroxyethyl methacrylate. Alternatively, in other embodiments, the first monomer and the second monomer may be selected from methacrylic acid, styrene and other vinyl monomers; methyl methacrylate, methyl acrylate, butyl acrylate, hydroxypropyl acrylate and other monomers containing unsaturated double bonds; or methyl acrylamide, acrylamide, N-methyl acrylamide and other amide monomers containing double bonds. In consideration of the hydrophilicity of the polymerized resin, acrylic acid, acrylamide and hydroxyethyl methacrylate may be selected as the first monomer and the second monomer.

In some embodiments, the first temperature ranges from 90° C. to 110° C., which is, for example, 90° C., 95° C., 100° C., 105° C., 110° C., or the like. In some embodiments, during the preparation of the above-described acrylic resin, it reacts for 0.5 to 2 h at 90° C. to 110° C. by maintaining the temperature. For example, it reacts for 0.5 h, 0.8 h, 0.1 h, 1.5 h, 2 h or the like at an oil bath temperature such as 90° C., 95° C., 100° C., 105° C. or 110° C. by maintaining the temperature.

In some specific implementations, the acrylic resin is prepared with the following method: as counted in parts by mass, heating 50 parts of propylene glycol methyl ether acetate to 90° C. to 110° C. under conditions of stirring and an oil bath, and adding 0.5 to 1 part of an initiator, i.e., tert-butyl hydroperoxide, to obtain a mixture A; mixing 33 parts of acrylic acid and 17 parts of hydroxyethyl methacrylate with 0.3 parts of the initiator, i.e., tert-butyl hydroperoxide, to obtain a mixture B; dropping the mixture B to the mixture A, and after dropping, adding 0.2 parts of the initiator, i.e., tert-butyl hydroperoxide, to a reaction system to react for 0.5 hours to 2 hours at 90° C. to 110° C. by maintaining the temperature, to obtain the acrylic resin.

Further, during the preparation of the heat exchanger, surfaces of the heat exchange pipe and/or the fin are pretreated, and then the composite material is applied to the pretreated surfaces of the heat exchange pipe and/or the fin and cured, to obtain the heat exchanger.

Specifically, in some embodiments, the surfaces of the heat exchange pipe and/or the fin of the heat exchanger are pretreated, and steps of pretreating the heat exchanger specifically include: sandblasting the surfaces of the heat exchange pipe and/or the fin of the heat exchanger for 100 to 200 meshes, cleaning the surfaces of the heat exchange pipe and/or the fin with alcohol or acid, and then drying in the air or drying at 35° C. to 50° C.

Further, during the pretreatment, in some embodiments, a number of sandblasted meshes range from 120 to 180. For example, the number of sandblasted meshes is 150. The cleaning manner used may be, for example, ultrasonic cleaning with anhydrous ethanol or cleaning by acid etching.

In some embodiments of the present application, methods of applying the composite material to the heat exchanger include, but not limited to, at least one of dip coating, spray coating, brush coating, curtain coating and roller coating. In view of the convenience of implementation, the composite material according to the embodiments of the present application may be applied to the pretreated surfaces of the heat exchange pipe and/or the fin by spray coating or dip coating. The time for dip coating ranges from 2 to 5 min, further optionally from 2 to 3 min. The number of times for dip coating ranges from 2 to 5, further optionally from 2 to 3.

In some embodiments, the composite material is applied to the pretreated surfaces of the heat exchange pipe and/or the fin and then cured. The curing temperature ranges from 180° C. to 220° C., and further optionally ranges from 190° C. to 210° C., and further optionally is 200° C. The curing time ranges from 0.5 hours to 2 hours, and further optionally ranges from 0.8 hours to 1.5 hours, and further optionally is 1 hour.

By using the composite material according to the present application and by further adjusting and optimizing the preparation conditions of the heat exchanger, the heat exchanger having a coating with better hydrophilic durability can be prepared. The test shows that the coating has a contact angle less than 10°, which has good hydrophilic properties and may improve the drainage, and the coating has good hydrophilic durability.

In other embodiments according to the present application, the composite material of the present application may also be applied to non-heat exchanger products, such as heat-pump water heaters. Certainly, the composite material according to the embodiments of the present application may be applied to other products requiring improvement in hydrophilic properties and/or hydrophilic durability.

Figure 5:
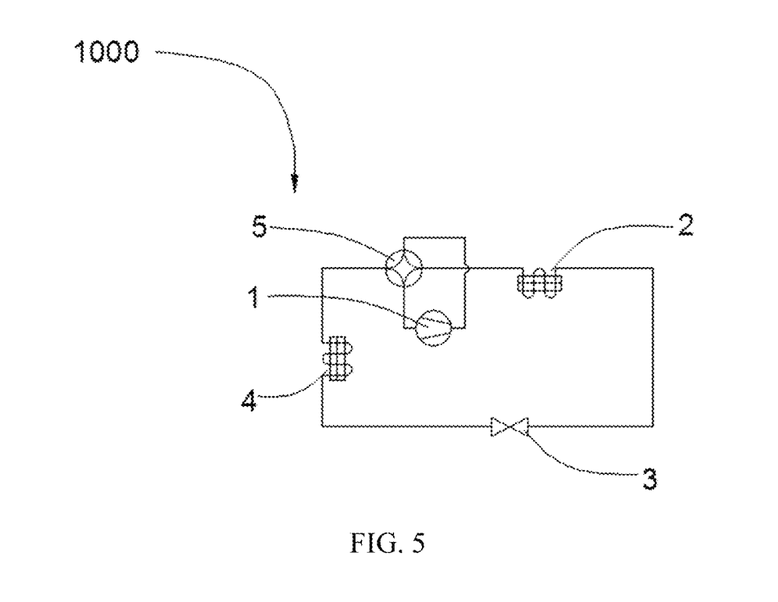
FIG. 5 is a schematic structural diagram of a thermal management system according to an exemplary embodiment of the present application.

An embodiment of the present application further provides a thermal management system, comprising the heat exchanger described above. Specifically, FIG. 5 shows a thermal management system 1000 according to an exemplary embodiment of the present application. The thermal management system 1000 includes at least a compressor 1, a first heat exchanger 2, a throttling device 3, a second heat exchanger 4 and a reversing device 5. The compressor 1 of the thermal management system 1000 may be a horizontal compressor or a vertical compressor. The throttling device 3 may be an expansion valve, or the throttling device 3 is another part that reduces pressure and regulates a flow rate of a refrigerant. The present application document does not specifically limit the type of the throttling device, which may be selected according to an actual application environment, and is not described in detail herein. It should be noted that some systems may not be provided with the reversing device 5. The heat exchanger in the above embodiments of the present application may be used in the thermal management system 1000 as the first heat exchanger 2 and/or the second heat exchanger 4. In the thermal management system 1000, the compressor 1 compresses the refrigerant, a temperature of the refrigerant rises after compression, and then the refrigerant enters the first heat exchanger 2 with the heat being transferred to the outside through heat exchange between the first heat exchanger 2 and the outside, and then the refrigerant passing through the throttling device 3 changes into a liquid state or a gas-liquid two-phase state, in this case, the temperature of the refrigerant decreases, and then the refrigerant at the lower temperature flows to the second heat exchanger 4, and re-enters the compressor 1 after exchanging heat with the outside at the second heat exchanger 4, to achieve circulation of the refrigerant.

In other implementations of the present application, the composite material in the present application may also be applied to non-heat exchanger products, such as filtration devices in air conditioning systems. Certainly, the composite material according to the implementations of the present application may be applied to other products requiring improvement in hydrophilicity and/or antibacterial and mildew inhibition.

In order to fully explain the hydrophilicity and hydrophilic durability of the heat exchanger according to the present application, and facilitate the understanding of the present invention, several groups of experimental verification are performed in the present application. The present invention is further described below in conjunction with specific embodiments and comparative examples. It would be understood by those skilled in the art that only some examples are described in the present application, and that any other appropriate specific examples all fall within the scope of the present application.

Embodiment 1

1. Preparation of Composite Material

As counted in parts by mass, 10 parts of acrylic resin was mixed with 90 parts of hydrophilic mixed sol evenly, to obtain the composite material, where parts by mass of the components of the hydrophilic mixed sol were: 91 parts of hydrophilic modified silica sol and 5 parts of titanium dioxide sol.

2. Manufacturing of Heat Exchanger

Surfaces of a heat exchange pipe and/or a fin of a heat exchanger to which a coating is to be applied were pretreated, specifically comprising: sandblasting the surfaces of the heat exchange pipe and/or the fin for 150 meshes, cleaning the surfaces of the heat exchange pipe and/or the fin with anhydrous ethanol, and drying in the air.

The composite material obtained in step 1 was applied to the pretreated surfaces of the heat exchange pipe and/or the fin by dip coating or spray coating, and cured for 1 h at 200° C., to obtain the heat exchanger with a coating.

Embodiments 2-3

The composite material and the heat exchanger were prepared in the same manner as in Embodiment 1, with a difference in the ratio of acrylic resin to hydrophilic mixed sol.

In Embodiment 2, 20 parts of acrylic resin and 80 parts of hydrophilic mixed sol were mixed evenly.

In Embodiment 3, 30 parts of acrylic resin and 70 parts of hydrophilic mixed sol were mixed evenly.

The rest were the same as that in Embodiment 1.

Embodiments 4-5

The composite material and the heat exchanger were prepared in the same manner as in Embodiment 1, with a difference in the type of the hydrophilic resin.

In Embodiment 4, the hydrophilic resin was amino resin.
In Embodiment 5, the hydrophilic resin was alkyd resin.
The rest were the same as that in Embodiment 1.

Embodiments 6-10

The composite material and the heat exchanger were prepared in the same manner as in Embodiment 1, with a difference in the preparation of the acrylic resin.

In Embodiment 6, at least part of the acrylic resin was prepared with the following method: as counted in parts by mass, 50 parts of propylene glycol methyl ether acetate were heated to 100° C. under conditions of stirring and an oil bath, and 1 part of tert-butyl hydroperoxide was added to obtain a mixture A; 33 parts of acrylic acid, 17 parts of hydroxyethyl methacrylate and 0.3 parts of tert-butyl hydroperoxide were mixed evenly, to obtain a mixture B; the mixture B was dropped into the mixture A, and after the dropping, 0.2 parts of tert-butyl hydroperoxide were adding into a reaction system to react for 1 h at 100° C. by maintaining the temperature, to obtain the acrylic resin. The rest were the same as that in Embodiment 1.

Embodiment 7 is different from Embodiment 6 in that tert-butyl hydroperoxide was replaced with azodiisobutyronitrile. The rest were the same as that in Embodiment 6.

Embodiment 8 is different from Embodiment 6 in that tert-butyl hydroperoxide was replaced with dibenzoyl peroxide, and an amount of dibenzoyl peroxide added to the mixture A was 0.5 parts. The rest were the same as that in Embodiment 6.

Embodiment 9 is different from Embodiment 6 in that 33 parts of acrylic acid and 17 parts of hydroxyethyl methacrylate were replaced with 33 parts of methacrylic acid and 17 parts of hydroxypropyl acrylate. The rest were the same as that in Embodiment 6.

Embodiment 10 is different from Embodiment 6 in that 33 parts of acrylic acid and 17 parts of hydroxyethyl methacrylate were replaced with 32 parts of acrylic acid and 18 parts of acrylamide. The rest were the same as that in Embodiment 6.

Embodiments 11-17

The composite material and the heat exchanger were prepared in the same manner as in Embodiment 1, with a difference in the preparation of the hydrophilic mixed sol.

In Embodiment 11, (a) as counted in parts by mass, 31 parts of KH-560, 7 parts of ethyl orthosilicate and 54 parts of anhydrous ethanol were mixed evenly by mechanical stirring under a water bath condition at about 50° C. to obtain a mixture; 3 parts of water and 1 part of sodium dodecyl sulfate were mixed evenly, and then added to the mixture; and then 1 part of formic acid and 3 parts of water were dropped to the mixture and mixed evenly, to react for about 24 h under the unchanged reaction conditions, to obtain the hydrophilic modified silica sol.

(b) As counted in parts by mass, 35 parts of the hydrophilic modified silica sol obtained in step (a), 56 parts of commercially available silica sol and 5 parts of titanium dioxide sol were mixed, a pH value of the system was adjusted to about 3.0 by using 4 parts of the pH modifier, i.e., formic acid, and then the mixture was stirred under a water bath condition at about 50° C. to react for about 4 h, to obtain the hydrophilic mixed sol.

Embodiment 12 is different from Embodiment 11 in that, in step (a), as counted in parts by mass, 32 parts of KH-560, 8 parts of ethyl orthosilicate and 53 parts of anhydrous ethanol were mixed evenly by mechanical stirring under a water bath condition at about 50° C. to obtain a mixture; 2.5 parts of water and 0.5 part of sodium dodecyl sulfate were mixed evenly, and then added to the mixture; and then 1.5 part of formic acid and 2.5 parts of water were dropped to the mixture and mixed evenly, to react for about 24 h under the unchanged reaction conditions, to obtain the hydrophilic modified silica sol. The rest were the same as that in Embodiment 11.

Embodiment 13 is different from Embodiment 11 in that, in step (a), as counted in parts by mass, 30 parts of KH-560, 6 parts of ethyl orthosilicate and 56 parts of anhydrous ethanol were mixed evenly by mechanical stirring under a water bath condition at about 50° C. to obtain a mixture; 2.6 parts of water and 1.4 part of sodium dodecyl sulfate were mixed evenly, and then added to the mixture; and then 1.2 part of formic acid and 2.8 parts of water were dropped to the mixture and mixed evenly, to react for about 24 h under the unchanged reaction conditions, to obtain the hydrophilic modified silica sol. The rest were the same as that in Embodiment 11.

Embodiment 14 is different from Embodiment 11 in that, in step (b), as counted in parts by mass, 37 parts of the hydrophilic modified silica sol prepared, 55 parts of commercially available silica sol and 5 parts of titanium dioxide sol were mixed, a pH value of the system was adjusted to about 3.0 by using 3 parts of the pH modifier, i.e., formic acid, and then the mixture was stirred under a water bath condition at about 50° C. to react for about 4 h, to obtain the hydrophilic mixed sol. The rest were the same as that in Embodiment 11.

Embodiment 15 is different from Embodiment 11 in that, in step (b), as counted in parts by mass, 34 parts of the hydrophilic modified silica sol prepared, 56 parts of commercially available silica sol and 5.5 parts of titanium dioxide sol were mixed, a pH value of the system was adjusted to about 3.0 by using 4.5 parts of the pH modifier, i.e., formic acid, and then the mixture was stirred under a water bath condition at about 50° C. to react for about 4 h, to obtain the hydrophilic mixed sol. The rest were the same as that in Embodiment 11.

Embodiment 16 is different from Embodiment 11 in that, in step (b), as counted in parts by mass, 91 parts of the hydrophilic modified silica sol prepared and 5 parts of titanium dioxide sol were mixed, a pH value of the system was adjusted to about 3.0 by using 4 parts of the pH modifier, i.e., formic acid, and then the mixture was stirred under a water bath condition at about 50° C. to react for about 4 h, to obtain the hydrophilic mixed sol. The rest were the same as that in Embodiment 11.

Embodiment 17 is different from Embodiment 11 in that, in step (b), as counted in parts by mass, 91 parts of commercially available silica sol and 5 parts of titanium dioxide sol were mixed, a pH value of the system was adjusted to about 3.0 by using 4 parts of the pH modifier, i.e., formic acid, and then the mixture was stirred under a water bath condition at about 50° C. to react for about 4 h, to obtain the hydrophilic mixed sol. The rest are the same as that in Embodiment 11.

Comparative Example 1

Comparative Example 1 is different from Embodiment 1 in that the composite material in Comparative Example 1 did not contain hydrophilic resin. That is, the composite material in Comparative Example 1 was only hydrophilic mixed sol.

Comparative Example 2

Comparative Example 2 is different from Embodiment 1 in that the composite material in Comparative Example 2 did not contain hydrophilic mixed sol. That is, the composite material in Comparative Example 2 was only hydrophilic resin.

Property Test

1. Hydrophilicity Test (Contact Angle Test)

A test instrument was a contact angle measuring instrument, which measured a contact angle of a sample based on optical imaging principles and by image contour analysis. The contact angle refers to an angle formed when a drop of liquid is dropped on a horizontal plane of a solid, and a liquid phase is sandwiched between two tangent lines of a gas-liquid interface and a solid-liquid interface at a gas-liquid-solid three-phase junction on a surface of the solid.

During the test, the contact angle measuring instrument and a computer connected thereto were turned on, and testing software was turned on.

A specimen was put on a horizontal workbench, an amount of droplets was adjusted by a micro-sampler, the volume was generally about 1 µL, liquid was dropped on a needle to form droplets, a knob was rotated to move up the workbench, so that a surface of the specimen contacts the droplets, then the workbench was moved down, and the droplets may be left on the specimen.

The contact angle of this region was obtained by testing and data analysis conducted by the testing software. For each embodiment and the comparative example, 5 different points of the specimen were taken for testing and then averaged, which was denoted as the contact angle of the specimen in the embodiment and the comparative example.

The results of the above contact angle test show that the surface state of the samples of Embodiment 1 to Embodiment 15 are basically normal, and the surface of the sample of Embodiment 16 is slightly powdery. Moreover, the initial contact angles of the surface of the samples of Embodiment 1 to Embodiment 16 are less than 10°, and the initial contact angle of the surface of the sample of Embodiment 17 is 40.580°. The initial contact angle of the surface of the sample of Comparative Example 1 is also less than 10°, and the initial contact angle of the surface of the sample of Comparative Example 2 is 57.542°. Thus, in Embodiment 16 where the hydrophilic modified silica sol was self-made, the surface state of the sample is slightly affected, but the contact angles of the surfaces of Embodiment 1 to Embodiment 16 are all less than 10°, which indicates that the coating formed by the composite material according to the present application has relatively excellent hydrophilicity, which is conducive to promoting the discharge of condensate water in a confined space. Since the sample of Comparative Example 2 contains only hydrophilic resin rather than hydrophilic mixed sol, the initial contact angle is only 57.542°, which is greatly different from the composite material containing hydrophilic mixed sol, and correspondingly has greater difficulty in film formation, for that although hydrophilic resin also has a certain number of hydrophilic groups, its hydrophilicity is poor.

2. Hydrophilic Durability Test (Exemplified by Embodiments 1-3 and Comparative Example 1)

2.1 Running Water Test

The heat exchanger samples in Embodiments 1-3 and Comparative Example 1 were immersed in running water, taken out and blow-dried every 24 h, contact angles were measured, and the contact angles in part of the time were recorded. Test results are shown in Table 1 and Table 2, respectively.

TABLE 1

Results of running water test in Embodiments 1-3

| Item | Running water test time | | | | | |
|---|---|---|---|---|---|---|
| | 0 h | 48 h | 72 h | 96 h | 336 h | 456 h | 520 h |
| Embodiment 1 | Tile < 10° | 38.541° | 36.528° | 36.871° | 38.847° | 45.711° | 52.189° |
| Embodiment 2 | Tile < 10° | 34.514° | 35.004° | 36.25° | 34.315° | 42.578° | 53.857° |
| Embodiment 3 | Tile < 10° | 32.975° | 27.957° | 31.829° | 36.218° | 36.526° | 40.902° |

TABLE 2

Results of running water test in Comparative Example 1

| Item | Running water test time | | | | |
|---|---|---|---|---|---|
| | 0 h | 24 h | 48 h | 72 h | 96 h |
| Comparative Example 1 | Tile < 10° | 29.8° | 39.566° | 41.348° | 43.443° |

As can be seen from the data in Table 1 and Table 2, the hydrophilic durability of the surfaces of the coating of the heat exchangers of Embodiment 1 to Embodiment 3 was better than that of the surface of the coating of the heat exchanger of Comparative Example 1. In particular, after 520 h of running water test, the contact angle of the surface of the coating of the sample of Embodiment 3 may reach 40.902°, while the contact angle of the surface of the coating of the sample of Comparative Example 1 was greater than 41° after 72 hours of test, which indicated that the coating formed by the composite material according to the present application has excellent hydrophilic durability.

2.2 Cold and Heat Alternating Test

The heat exchanger samples in Embodiment 1 to Embodiment 3 and Comparative Example 1 were placed in a cold and heat alternating box, and the temperature range of −40 to 120° C. was recorded as a cycle. After a certain number of cycles, they were taken out and blow-dried for the contact angle test. Test results are shown in Table 3 and Table 4, respectively.

TABLE 3

Results of cold and heat alternating test of Embodiments 1-3

| Item | Cold and heat cycles/times | | | Sample surface state after 100 cycles |
|---|---|---|---|---|
| | 0 | 40 | 100 | |
| Embodiment 1 | Tile < 10° | 6.592° | 52.109° | Surfacing |
| Embodiment 2 | Tile < 10° | 5.765° | 60.395° | Surfacing |
| Embodiment 3 | Tile < 10° | Tile < 10° | 13.801° | Surfacing |

TABLE 4

Results of cold and heat alternating test of Comparative Example 1

| Item | Cold and heat cycles/times | | Sample surface state after 100 cycles |
|---|---|---|---|
| | 0 | 100 | |
| Comparative Example 1 | Tile < 10° | 21.624° | The surface of the coating of the sample was uneven and the coating was powdery |

As can be seen from the data in Table 3 and Table 4, after 100 cold and heat cycle test on the hydrophilic durability of the surfaces of the coatings of the heat exchangers of Embodiment 1 to Embodiment 3, the contact angle of the surface of the coating of the sample of Embodiment 3 may reach 13.801°, the result of Embodiment 3 was better than that of the other two embodiments, and after 100 cold and heat cycle test, the surfaces of the coatings of the heat exchangers from Embodiment 1 to Embodiment 3 were relatively flat, which was conductive to the implementation on the surface of the heat exchanger. The contact angle of the surface of the coating of the sample of Comparative Example 1 reaches 21.6240 after 100 cold and heat cycling tests, the data of the contact angle was worse than that of Embodiment 3, and the surface state of the sample of Comparative Example 1 was worse after 100 cycles, which shows that the coating was not smooth and easy to powder, leading to poor hydrophilic durability of the coating. It was difficult to implement this state to heat exchanger products. The above indicates the excellent hydrophilic durability of the coating formed by the composite material according to the present application.

In addition, as can be seen from Table 1 to Table 4, the content of the hydrophilic resin in Embodiment 3 was greater than that in Embodiment 1 and Embodiment 2, so it can be known that increasing the content of the hydrophilic resin in an appropriate range can improve the hydrophilic durability of the composite material. In addition, the hydrophilic durability of the heat exchangers prepared in Embodiment 4 to Embodiment 17 was similar to that prepared in the above embodiments, which is not described in detail due to space limitations.

In the description of the present application, reference terms such as "one embodiment", "some embodiments", "exemplary embodiments", "example(s)", "specific example(s)" and "some examples" mean that a specific feature, structure, material, or characteristic described in connection with the embodiment or example is comprised in at least one embodiment or example of the present application. In the specification, the schematic expressions of the above terms are not necessarily referring to the same embodiment or example. In addition, the described specific features, structures, materials or characteristics may be combined in one or more embodiments or examples in an appropriate manner. Location terms such as "up", "down" "inside" and "outside" described in the embodiments of the present application are described from the angles as shown in the accompanying drawings and should not be understood as limitations on the embodiments of the present application.

Although the embodiments of the present application have been shown and described, those of ordinary skill in the art may understand that changes, modifications, replacements and variations may be made to these embodiments without departing from the principle and purpose of the present application, and the scope of the present application is limited by the claims and equivalents thereof.

What is claimed is:

1. A heat exchanger, comprising:
a metal substrate having a fluid channel for circulating a heat exchange medium; and
a coating coated at least a part of a surface of the metal substrate,
wherein the coating comprises resin, silica, and titanium dioxide,
wherein the resin is hydrophilic resin having a polymer network structure, the silica is hydrophilic modified silica, and the hydrophilic modified silica and the titanium dioxide are dispersed in the polymer network structure, and
wherein, in the coating, a sum of a mass percentage of the silica and a mass percentage of the titanium dioxide is greater than a mass percentage of the resin.

2. The heat exchanger according to claim 1, further comprising a covalent bond connecting between the coating and the metal substrate.

3. The heat exchanger according to claim 1, wherein at least part of the resin is hydrophilic resin, and the hydrophilic resin comprises at least one of acrylic resin, amino resin, polyurethane resin, alkyd resin, and epoxy resin.

4. The heat exchanger according to claim 1, wherein at least part of the silica is hydrophilic modified silica, and at least part of the hydrophilic modified silica has a particle size in nanometer scale.

5. The heat exchanger according to claim 1, wherein the coating is hydrophilic, and a static contact angle between the coating and water attached to the coating is smaller than or equal to 10°.

6. The heat exchanger according to claim 1, wherein the coating is a single-layer coating, and a weight per unit area of the coating ranges from 9 g/m2 to 14 g/m2.

7. The heat exchanger according to claim 1, wherein the metal substrate comprises a collecting pipe, a fin, and a heat exchange pipe,
wherein the heat exchange pipe is fixed to the collecting pipe, the fin is retained to the heat exchange pipe,
wherein an inner cavity of the heat exchange pipe is communicated with an inner cavity of the collecting pipe, and
wherein the coating is arranged to cover at least part of a surface of at least one of the collecting pipe, the fin or the heat exchange pipe.

8. The heat exchanger according to claim 1, wherein an outer surface of the metal substrate has an uneven rough surface, roughness of the rough surface is defined as Ra, which meets with following relation: $0.5\ \mu m \leq Ra \leq 10\ \mu m$, and the coating is arranged to cover at least part of the rough surface.

9. A manufacturing method of a heat exchanger, comprising:
providing a metal substrate and a composite material, wherein the metal substrate has at least one fluid channel for circulating a heat exchange medium, and the composite material comprises resin, silica, and titanium dioxide; and
applying the composite material to cover at least a part of the metal substrate,
wherein the resin is hydrophilic resin having a polymer network structure, the silica is hydrophilic modified silica, and the hydrophilic modified silica and the titanium dioxide are dispersed in the polymer network structure, and
wherein, in the composite material, a sum of a mass percentage of the silica and a mass percentage of the titanium dioxide is greater than a mass percentage of the resin.

10. The manufacturing method according to claim 9, wherein a preparation method of the composite material comprises:
mixing 10 to 30 parts by mass of hydrophilic resin and 70 to 90 parts by mass of hydrophilic mixed sol evenly by ultrasonic mixing or mechanical stirring, to obtain the composite material, the hydrophilic mixed sol comprises sol particles, and the sol particles comprise silica and titanium dioxide.

11. The manufacturing method according to claim 10, wherein a preparation method of the hydrophilic mixed sol comprises:
mixing 90 to 92 parts by mass of hydrophilic modified silica sol and 4 to 6 parts by mass of titanium dioxide sol to obtain a mixture, adjusting a pH value of the mixture to 2.5 to 3.5 by adding 3 to 5 parts by mass of a pH modifier, and then stirring the mixture to react at 45° C. to 55° C. for 3.5 hours to 5 hours, to obtain the hydrophilic mixed sol.

12. The manufacturing method according to claim 11, wherein a preparation method of at least part of the hydrophilic modified silica sol comprises:
mixing 36 to 40 parts by mass of a silane precursor and 50 to 56 parts by mass of a solvent evenly at 45° C. to 55° C., adding 2 to 4 parts by mass of water and 0.5 to 1.5 parts by mass of a surfactant, and mixing evenly, and then adding 1 to 2 parts by mass of acid and 2 to 4 parts by mass of water to react for 22 hours to 24 hours, to obtain the hydrophilic modified silica sol.

13. The manufacturing method according to claim 12, wherein the preparation method of the at least part of the hydrophilic modified silica sol comprises at least one of the following features:
   a) the silane precursor comprises 30 to 32 parts by mass of γ-glycidyl ether oxypropyl trimethoxysilane and 6 to 8 parts by mass of ethyl orthosilicate;
   b) the solvent comprises an alcohols solvent; or
   c) the surfactant comprises at least one of sodium dodecyl sulfate, sodium dodecyl sulfonate, sodium dodecyl benzene sulfonate, and cetyl benzene sulfonate.

14. The manufacturing method according to claim 9, wherein the resin comprises acrylic resin, and a preparation method of at least part of the acrylic resin comprises:
   mixing a first portion of an initiator with propylene glycol methyl ether acetate preheated to a first temperature, to obtain a mixture A;
   mixing a first monomer, a second monomer, and a second portion of the initiator, to obtain a mixture B; and
   dropping the mixture B to the mixture A, and after the dropping, adding a third portion of the initiator to a reaction system to react for 0.5 hours to 2 hours at a temperature of 90° C. to 110° C., to obtain the acrylic resin.

15. The manufacturing method according to claim 14, wherein, the acrylic resin is prepared from raw materials as follows: 45 to 55 parts by mass of propylene glycol methyl ether acetate, 0.5 to 1 part by mass of the first portion of the initiator, 30 to 35 parts by mass of the first monomer, 15 to 20 parts by mass of the second monomer, 0.2 to 0.4 parts by mass of the second portion of the initiator, and 0.1 to 0.3 parts by mass of the third portion of the initiator.

16. The manufacturing method according to claim 14, wherein the initiator comprises at least one of tert-butyl hydroperoxide, azodiisobutyronitrile, dibenzoyl peroxide, tert-amyl peroxide, di-tert-butyl peroxide, di-tert-amyl peroxide, dicumyl peroxide, ethyl 3,3-bis(tert-butylperoxy) butyrate, ethyl 3,3-bis(tert-amylperoxy) butyrate, tert-butyl peroxybenzoate, tert-amyl peroxybenzoate, tert-amyl peroxy pivalate, 1,1'-bis(tert-butylperoxy)-3,3,5-trimethylcyclohexane, tert-butyl peroxy-2-ethylhexanoate, and tert-amyl peroxy-2-ethylhexanoate.

17. The manufacturing method according to claim 14, wherein each of the first monomer and the second monomer comprises at least one of acrylic acid, hydroxyethyl methacrylate, methacrylic acid, styrene, methyl methacrylate, methyl acrylate, butyl acrylate, hydroxypropyl acrylate, methyl acrylamide, acrylamide, and N-methyl acrylamide.

18. The manufacturing method according to claim 14, wherein the first temperature ranges from 90° C. to 110° C.

19. A heat exchanger, comprising:
   a first collecting pipe defining a first chamber;
   a second collecting pipe defining a second chamber, the second collecting pipe being parallel to the first collecting pipe;
   a plurality of flat tubes connecting between the first and second collecting pipes, each of the plurality of flat tubes defining a row of micro channels, the micro channels being fluidic communication with the first chamber and the second chamber for flowing refrigerant therebetween;
   a plurality of corrugated fins each sandwiched between two adjacent flat tubes of the plurality of flat tubes, each of the plurality of corrugated fins comprising a plurality of crests connecting to one of the two adjacent flat tubes and a plurality of troughs connecting to the other one of the two adjacent flat tubes; and
   a coating layer coated on surfaces of at least one of the plurality of corrugated fins, the plurality of flat tubes, or the first and second collecting pipes,
   wherein the coating layer comprises resin, silica, and titanium dioxide,
   wherein the resin is hydrophilic resin having a polymer network structure, the silica is hydrophilic modified silica, and the hydrophilic modified silica and the titanium dioxide are dispersed in the polymer network structure, and
   wherein, in the coating layer, a sum of a mass percentage of the silica and a mass percentage of the titanium dioxide is greater than a mass percentage of the resin.

* * * * *